United States Patent [19]

Gundlach et al.

[11] Patent Number: 5,531,815
[45] Date of Patent: Jul. 2, 1996

[54] THERMAL INK JET COMPOSITION

[75] Inventors: Kurt B. Gundlach, Pittsford; Richard L. Colt, Rochester, both of N.Y.

[73] Assignee: Xerox Corporation, Stamford, Conn.

[21] Appl. No.: 474,597

[22] Filed: Jun. 7, 1995

[51] Int. Cl.$^6$ .................................................. C09D 11/02
[52] U.S. Cl. .................. 106/20 R; 106/22 R; 106/22 H; 106/20 D
[58] Field of Search .............................. 106/20 R, 22 H, 106/22 R, 20 D

[56] References Cited

U.S. PATENT DOCUMENTS

| | | | |
|---|---|---|---|
| 4,026,713 | 5/1977 | Sambucetti et al. | 106/20 B |
| 4,400,216 | 8/1983 | Arora | 106/20 R |
| 4,508,570 | 4/1985 | Fujii et al. | 106/22 R |
| 4,623,689 | 11/1986 | Shintani et al. | 524/457 |
| 4,627,876 | 12/1986 | Fries et al. | 106/27 R |
| 4,914,562 | 4/1990 | Abe et al. | 346/140 R |
| 5,019,166 | 5/1991 | Schwarz | 106/22 R |
| 5,106,416 | 4/1992 | Moffatt et al. | 106/22 R |
| 5,116,409 | 5/1992 | Moffatt | 106/22 R |
| 5,118,350 | 6/1992 | Prasad | 106/22 R |
| 5,133,803 | 7/1992 | Moffatt | 106/22 F |
| 5,143,547 | 9/1992 | Kappele | 106/22 R |
| 5,145,519 | 9/1992 | Kappele | 106/22 R |
| 5,254,159 | 10/1993 | Gundlach et al. | 106/22 H |
| 5,273,573 | 12/1993 | Kappele | 106/22 R |
| 5,342,440 | 8/1994 | Wickramanayake | 106/22 R |
| 5,441,561 | 8/1995 | Chujo et al. | 106/20 C |

*Primary Examiner*—Helene Klemanski
*Attorney, Agent, or Firm*—Oliff & Berridge

[57] ABSTRACT

A thermal ink jet printing composition contains a betaine zwitterionic base and a quasisurfactant penetrant.

21 Claims, No Drawings

THERMAL INK JET COMPOSITION

BACKGROUND OF THE INVENTION

The invention relates to a thermal ink jet composition, a printing process and a method of improving the fast dry characteristics of inks.

Ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field that adjusts the trajectory of each droplet in order to direct it to a gutter for recirculation or to a specific location on a recording medium. In drop-on-demand systems, a droplet is expelled from an orifice directly to a position on a recording medium in accordance with digital data signals. A droplet is not formed or expelled unless it is to be placed on the recording medium.

Quality thermal ink jet printing can be achieved by utilizing an aqueous ink composition containing at least one dye or pigment, a wetting agent and water. U.S. Pat. No. 4,508,570 to Fujii et al., discloses an aqueous ink for ink jet printing, which comprises a water-soluble direct dye and/or acid dye, a polyhydric alcohol and/or an alkyl ether thereof, water, and at least one water-soluble non-ionic surface active agent selected from a specified polyoxyethylene alkyl amine, a specified polyoxyethylene alkyl phenyl ether and a specified polyoxyethylene alkyl ether. U.S. Pat. No. 4,623,689 to Shintan/et al., discloses an ink jet ink containing aqueous colored polymers, which comprise a homopolymer of an ethylenically unsaturated sulfonic acid or its salt or a copolymer of an ethylenically unsaturated sulfonic acid or its salt with another ethylenically unsaturated monomer, wherein the homopolymer or copolymer is dyed with a basic dye and has a lowest film-forming temperature of not higher than 35° C. U.S. Pat. No. 4,627,876 to Fries et al., discloses a printing ink containing a pigment and an alkyd resin binder. The resin binder is modified with fatty acids. The alkyd resin is the reaction product of (a) a fatty acid, triglyceride of a fatty acid or a mixture of fatty acids, (b) a polyol, (c) an epoxy resin and (d) a dicarboxylic acid.

U.S. Pat. No. 4,026,713 to Sambucetti et al. relates to a magnetic ink containing non-ionic, cationic and/or anionic surfactants. The surfactants may include glycerol, a lower alkyl monoether of ethylene glycol and/or a polyethylene diol.

U.S. Pat. No. 4,914,562 to Abe et al. discloses an ink jet composition containing an ionic surface active agent or a non-ionic surface active agent. The ionic surface active agent can be a dioctyl sulfosuccinate sodium salt, sodium oleate or dodecylbenzenesulfonic acid. The non-ionic surface active agent may be diethylene glycol mono-n-butyl ether or triethylene glycol mono-nbutyl ether.

U.S. Pat. No. 5,019,166 to Schwarz relates to a thermal ink jet printing composition comprising a dye, a liquid medium and a surfactant selected from the group consisting of polyoxyalkylated ethers, anionic bitail fluorothio alkyls, alkyl aryl sulfonates, alkyl amine quaternary salts and mixtures thereof.

U.S. Pat. No. 5,116,409 to Moffatt discloses a process for reducing color bleed of inks employed in thermal ink jet printing. The process comprises printing two inks side by side, each ink having a composition comprising (a) a vehicle and (b) about 0.1 to 10 wt. % of at least one water-soluble anionic dye. The vehicle comprises at least one member selected from the group consisting of zwitterionic surfactants and non-ionic amphiphiles and water or water and an organic solvent. Moffatt discloses a composition that includes SURFYNOL 5465, an acetylenic polyethylene oxide, and 1,5pentanediol.

U.S. Pat. No. 5,254,159 to Gundlach et al. discloses an ink composition that comprises water, an anionic dye and an amine compound. The ink composition provides waterfast images. The disclosure of this patent is incorporated in its entirety herein by reference.

Full color printing in a thermal ink jet printing process requires an ink with fast dry characteristics. Fast dry characteristics can be improved by the addition of a penetrant. The penetrant can be a quasisurfactant penetrant. For the purposes of this invention, the quasisurfactant penetrant has a hydrophilic head and a tail that is hydrophobic but too short to impart the properties of a strong surfactant like sodium lauryl sulfate. While surfactants with long hydrophobic tails typically form micelles at very low concentrations, the quasisurfactant penetrants do not form micelles. A preferred quasisurfactant penetrant is a surfactant that is substituted with a polar substituent toward one end of a chain of 4–8 aliphatic carbon atoms. Exemplary penetrants include dl-1,2-hexanediol, 1,2-octanediol, diethylene glyco butyl ether (or 2-(2-butoxethoxy)ethanol, 1-cyclohexyl-2-pyrrolidinone, 2-methyl2-propyl-1,3-propanediol and 1-butanesulfonic acid sodium salt.

A penetrant imparts quick-dry characteristics to a thermal ink jet ink composition. However, effectiveness of a penetrant in providing quick-dry characteristics varies with ink composition solvent. Some penetrants do not provide acceptable quick-dry characteristics to some ink-solvent systems. Cosolvents can be added to ink compositions to improve effectiveness of the surfactant penetrant or penetrant concentration in the ink compositions can be increased to achieve satisfactory quick-dry characteristics. However, some cosolvent packages and/or higher penetrant concentrations cause deterioration of thermal ink jet hardware. For example, higher loads of diethylene glyco butyl ether or higher loads of cyclohexyl pyrrolidinone aggressively attack cartridge materials and seals.

The incorporation of salts into inks containing organic non-ionic penetrants can aid in phase separation of an organic cosolvent through a "salting out" effect. Phase separation can reduce dry time of an ink on paper. This effect is observed for the incorporation of ionic salts such as sodium chloride. However, ionic salts destabilize ink compositions causing dye to precipitate.

The present invention relates to an improved thermal ink jet printing composition with reduced dry time. The composition is characterized by improved stability.

SUMMARY OF THE INVENTION

The present invention relates to an improved thermal ink jet printing composition containing liquid vehicle, a colorant and a surfactant comprising a betaine zwitterionic base and a quasisurfactant penetrant. The combination of the betaine zwitterionic base with a quasisurfactant penetrant provides an ink with dramatically enhanced penetration and with significantly reduced dry time on "plain" papers. The dramatically enhanced reduction in dry times permits formulation of fast drying inks with low cosolvent loads.

The present invention also relates to a thermal ink jet printing process comprising causing an ink jet composition comprising a liquid vehicle, a colorant and a surfactant comprising a betaine zwitterionic base and a quasisurfactant penetrant to be ejected in an imagewise fashion from a thermal ink jet printer onto a substrate.

Finally, the present invention is directed to a method of improving fast dry characteristics of thermal ink jet inks comprising incorporating into a thermal ink jet composition, a combination of a betaine zwitterionic base and a quasisurfactant penetrant.

DETAILED DESCRIPTION OF PREFERRED EMBODIMENTS

Inks of the present invention comprise a dye colorant. Generally, any effective dye, such as one of the direct dyes or the acid dyes, may be selected, provided that the dye is compatible with the other ink components and is soluble in the liquid medium.

Examples of suitable dyes include Bernacid Red 2BMN; Pontamine Brilliant Bond Blue A; BASF X-34; Pontamine; Food Black 2; Carodirect Turquoise FBL Supra Conc. (Direct Blue 199), available from Carolina Color and Chemical; Special Fast Turquoise 8GL Liquid (Direct Blue 86), available from Mobay Chemical; Intrabond Liquid Turquoise GLL (Direct Blue 86), available from Crompton and Knowles; Cibracron Brilliant Red 38-A (Reactive Red 4), available from Aldrich Chemical; Drimarene Brilliant Red X-2B (Reactive Red 56), available from Pylam, Inc.; Levafix Brilliant Red E-4B, available from Mobay Chemical; Levafix Brilliant Red E(6BA, available from Mobay Chemical; Procion Red H8B (Reactive Red 31), available from ICI America; Pylam Certified D&C Red #28 (Acid Red 92), available from Pylam; Direct Brill Pink B Ground Crude, available from Crompton & Knowles; Cartasol Yellow GTF Presscake, available from Sandoz, Inc.; Tartrazine Extra Conc. (FD&C Yellow #5, Acid Yellow 23), available from Sandoz; Carodirect Yellow RL (Direct Yellow 86), available from Carolina Color and Chemical; Cartasol Yellow GFT Liquid Special 110, available from Sandoz, Inc.; D&C Yellow #10 (Acid Yellow 3), available from Tricon; Yellow Shade 16948, available from Tricon, Basacid Black X34, available from BASF, Carta Black 2GT, available from Sandoz, Inc.; Neozapon Red 492 (BASF); Orasol Red G (Ciba-Geigy); Direct Brilliant Pink B (Crompton-Knolls); Aizen Spilon Red C-BH (Hodagaya Chemical Company); Kayanol Red 3BL (Nippon Kayaku Company); Levanol Brilliant Red 3BW (Mobay Chemical Company); Levaderm Lemon Yellow (Mobay Chemical Company); Spirit Fast Yellow 3G; Aizen Spilon Yellow C-GNH (Hodagaya Chemical Company); Sirius Supra Yellow GD 167; Cartasol Brilliant Yellow 4GF (Sandoz); Pergasol Yellow CGP (Ciba-Geigy); Orasol Black RL (CibaGeigy); Orasol Black RLP (Ciba-Geigy); Savinyl Black RLS (Sandoz); Dermacarbon 2GT (Sandoz); Pyrazol Black BG (ICI); Morfast Black Conc A (Morton-Thiokol); Diazol Black RN Quad (ICI); Orasol Blue GN (Ciba-Geigy); Savinyl Blue GLS (Sandoz); Luxol Blue MBSN (Morton-Thiokol); Severon Blue 5GMF (ICI); Basacid Blue 750 (BASF); and the like. Typical preferred dyes include Bernacid Red, available from Berncolors, Poughkeepsie, N.Y., Pontamine Brilliant Bond Blue, Berncolor A. Y. 34, Basacid Black X34, Carta Black 2 GT, Telon Fast Yellow 4GL-175, and the Like. The dye is generally present in the ink composition in an effective amount, generally from about 0.5 to about 8 percent by weight, and preferably from about 1 to about 6 percent by weight.

The inks of the present invention also include a liquid vehicle. Frequently, water comprises the major portion of the liquid vehicle and, while it may comprise 100 percent of the liquid vehicle, water is generally present in an amount of from about 7 to about 93 percent by weight of the ink, and preferably from about 55 to about 85 percent by weight of the ink.

Preferably, the inks of the present invention also contain a humectant such as a glycol, including ethylene glycol, propylene glycol, other glycols, or other known humectants as part of the liquid medium. When present, the humectant is present in an effective amount, generally from about 5 to about 60 percent by weight, preferably from about 10 to about 20 percent by weight, and most preferably at about 17 percent by weight. Any other suitable liquid medium can also be employed provided that the objectives of the present invention are achieved.

Optionally, the ink composition can include a biocide such as sorbic acid, 1-(3-chloroallyl)-3,5,7triaza-1-azoniaadamantane chloride, commercially available as Dowicil 200 (Dow Chemical Company, Midland, Mich.), vinylene-bis thiocyanate, commercially available as Dowicil 200 (Dow Chemical Company, Midland, Mich.), vinylene-bis thiocyanate, commercially available as Cytox 3711 (American Cyanamid Company, Wayne, N.J.), disodium ethylenebisdithiocarbamate, commercially available as Dithone D14 (Rohm & Haas Company, Philadelphia, Pa.), bis-(trichloromethyl) sulfone, commercially available as Biocide N-1386 (Stauffer Chemical Company, Westport, Conn.), zinc pyridimethione, commercially available as zinc omadine (Olin Corporation, Stamford, Conn.), 2-bromotnitropropane-1,3-diol, commercially available as onyxide 500 (Onyx Chemical Company, Jersey City, N.J.), Bosquat MB50 (Louza, Inc., Fairtown, N.J.) and the like may be present in the inks of the present invention. When present the biocide is in an effective amount, generally from about 0.01 to about 1 percent by weight, and preferably from about 0.1 to about 0.5 percent by weight.

The surfactant of the present invention comprises a betaine zwitterionic base and a quasisurfactant penetrant. A betaine zwitterionic base is characterized by the $-OOC.CH_2.N(CH_3)_3+$ moiety. Examples of betaine zwitterionic bases are betaine and carnitine. The related sulfobetaines and other zwitteronic surfactants with hydrophobic tails ranging from decyl to hexadecyl are effective as penetrants by themselves. However while betaine by itself has no surfactant properties, betaine is suitable in the surfactant of the present invention comprising the combination of the betaine zwitteronic base with a quasisurfactant penetrant.

Effectiveness of penetrants in providing quick-dry characteristics varies with ink solvents. Significantly high loads of solvents such as butylcarbitol or cyclohexylpyrrolidone are usually required in order to achieve satisfactory high dry times for competitive thermal jet inks. Such solvent/penetrant systems aggressively attack hardware of an ink jet printer including the cartridge materials and seals. The present invention provides a surfactant comprising the combination of a betaine zwitterionic base and a quasisurfactant penetrant that permits a surfactant load as low as 2.5 wt. %. Even at such a low weight percent, thermal ink jet inks according to the present invention provide fast-dry characteristics. It may be that the quasisurfactants in the presence of betaine, begin to "salt out" or form micelles as do true surfactants.

Ethylene glycol, trimethylol propane, sulfolane, n-methylpyrrolidione, thiodiethanol and glycerine have been found to be suitable cosolvents with the combination surfactant of the present invention. The ink jet inks of the present invention can comprise 1 to 50 wt. % betaine and 1 to 10 wt. % quasisurfactant penetrant. Preferably the compositions contain 10 to 20 wt. % betaine and 2 to 5 wt. % quasisurfactant penetrant. Most preferred is a composition containing 12 to 18 wt. % betaine and 2 to 4 wt. % 1,2-hexanediol.

Incorporation of a betaine zwitterionic base into inks containing organic non-organic surfactants reduces dry time. Reduction in dry time may be due to a phase separation of the organic cosolvent through a "salting out" effect. The addition of a betaine zwitterionic base not only improves dry times but does not destabilize the ink composition causing the dye to precipitate. Inks containing betaine remain stable, and in cases where the waterfastness additive package, N,N-bis-1-amino propylethylenediamine/$NH_4OH$/$H_3PO_3$, is incorporated, ink stability is enhanced. The betaine stabilizes the ink with the dye/additive package, N,N-bis-1-amino propylethylenediamine/$NH_4OH$/$H_3PO_3$ as pH is adjusted from basic toward neutral.

Increased penetration power through incorporation of betaine is most dramatic for alcohol containing organic penetrants, although an effect is observed for the pyrrolidone, cyclohexylpyrrolidone. A low level of sulfolane may be utilized to aid in stabilizing polyethylene oxide. The total load of organic cosolvent to obtain a fast dry ink equivalent in dry time to another vehicle that may contain 27% cosolvent is only 8% including sulfolane. As shown in the following examples, a reduction in dry time with betaine incorporation may be on the order of a factor of 130.

The invention will further be illustrated in the following, non-limiting examples.

placed on a roll mill for 5 minutes. The pH of the mixture is 12.01. The pH is adjusted to a pH of 8.77 by the addition of 70% phosphorous acid betaine, 16.01 grams, is added to the mixture and the bottle is again placed on the roll mill for 5 minutes. Thereafter, 4.15 grams of sulfolane, 3.5 grams of dl-1,2-hexanediol, 3.3 grams of Direct Red 227 Na (16.0% die solids), 18.53 grams of BASACID X-34 are added and the mixture is placed on the roll mill for an additional 10 minutes. A polyethylene oxide/bisphenol Adduct, 0.0296 gram and Dowicil, 0.0996 gram, are added and the mixture is replaced onto the roll mill for 30 minutes. The pH of the mixture is 8.71. The pH is adjusted to 8.51 by the addition of 0.2 grams of $H_3PO_3$. The total weight of the ink composition is 100.35 gm. The ink composition is placed on the roll mill for 30 minutes and then is settled overnight and filtered.

Filter time of the ink composition with a 0.2 micron ink filter at 60 psi pressure is 45 seconds. The ink produces a vigorous bubble and the filter is clean. D J-500 prints show 0.2 sec dry time, with comparable print quality to a high quality water fast packages such as WF CHARISM. The ink produces a true cool black color and very good water fastness with slight dye plume (indicated by a slight loss of print quality (feathering) when a print is exposed to high humidity).

The ink composition, method of preparing the composition and test results are summarized in Table I. In the Tables, RO Water is deionized water, GM is grams, PEO is a polyethylene oxide/bisphenol A adduct. Dry time of inks, where indicated, is determined by a wire wand bar draw down test. A wand with a wrapped wire (#8 wire) saturated with ink composition is drawn down a paper to deposit ink. The dry time on the paper is then measured.

TABLE I

| INGREDIENT/DESCRIPTION | VENDOR | AMOUNT (GM) | SOL N % | MOLE EQV |
| --- | --- | --- | --- | --- |
| RO WATER | 103 | 44.96 | | NA |
| N,N'-bis(5-aminopropyl)ethylenediamine (MW = 174) | BASF | 1.61 | 1.6 | 2 |
| AMMONIUM HYDROXIDE | CORCO | 3.21 | 3.2 | 9.6 |
| ROLL MILL 5 MIN. pH = 12.01 | NA | NA | NA | NA |
| 70% PHOSPHOROUS ACID (LOW CHLORIDE) pH = 8.77 | RHONE POULENIC | 4.04 | | |
| BETAINE (HYGROSCOPIC), ROLL MILL 5 MIN. HOMOGENEOUS | SIGMA | 16.01 | 16 | |
| SULFOLANE (97%) | PHILLIPS 66 | 4.15 | 4 | |
| D,L-1,2-HEXANEDIOL | ALDRICH | 3.5 | 3.5 | |
| DIRECT RED 227 Na (16.0% DYE SOLIDS) | TRICON | 3.3 | 3.27 | |
| BASACID X-34 | BASF | 18.53 | 18.27 | |
| ROLL MILL 10 MINUTES | NA | NA | NA | NA |
| PEO | POLYSCIENCE | 0.0296 | 0.03 | NA |
| DOWICIL | DOW | 0.0996 | 0.1 | |
| ROLL MILL 30 MINUTES (NO FOAM) | NA | NA | NA | NA |
| pH = 8.71, H3PO3, pH = 8.51 | RHONE POULENIC | 0.2 | | |
| INK WEIGHT-100.35 GM | NA | NA | NA | NA |
| ROLL MILL 30 MINUTES, LOW FOAM, SAT OVERNIGHT THEN FILTER 0.2 | NA | NA | NA | NA |

FILTER TIME 0.2 MICRON 60 PSI = 45 SECONDS, VIGOROUS BUBBLE & CLEAN FILTER.
PRINTS SHOWED 0.2 SEC DRY TIME, WITH COMPARABLE PRINT QUALITY TO WF CHARISMA.
TRUE COOL BLACK COLOR, VERY GOOD WATERFASTNESS WITH SLIGHT DYE PLUME.

EXAMPLE 1

In a bottle are mixed 44.96 grams of deionized water, 1.61 grams of N,N'-bis(5-aminopropyl) ethylenediamine (MW= 174) and 3.21 grams of ammonium hydroxide. The bottle is Comparative Examples I–VI Ink compositions are prepared according to the descriptions in the following Tables II–VII. The compositions are tested for stability and drytime.

TABLE II

| INGREDIENT/DESCRIPTION | VENDOR | AMOUNT (GM) | SOL N % | MOLE EQV |
|---|---|---|---|---|
| RO WATER | 103 | 80.06 | | NA |
| SULFOLANE (97%) | PHILLIPS 66 | 4.19 | 4 | |
| PEO | POLYSCIENCE | 0.301 | 0.03 | NA |
| DOWICIL (ROLL MILL 15 MINUTES, HOMOGENEOUS, FOAMED) | DOW | 0.0995 | 0.1 | |
| DIRECT RED 227 Na (16.0% DYE SOLIDS) | TRICON | 01-6401 | 1.9 | 0.08 |
| BASACID X-34 | BASF | 1.85 | 10.6 | 0.92 |
| ROLL MILL 30 MINUTES (HOMOGENEOUS) | NA | 10.59 | NA | NA |
| INK WEIGHT = 96.91 GM | NA | NA | NA | NA |
| RO WATER TO 100.00 GM INK | 103 | NA | | |
| pH = 7.44 | NA | 3.09 | | |
| ROLL MILL 30 MINUTES | NA | NA | NA | NA |
| | | NA | NA | NA |

DRAWDOWN DRY TIME ON COURTLAND FELT PAPER = 100 SECONDS

TABLE III

| INGREDIENT/DESCRIPTION | VENDOR | AMOUNT (GM) | SOL N % | MOLE EQV |
|---|---|---|---|---|
| RO WATER | 103 | 65.04 | | NA |
| SULFOLANTE (97%) | PHILLIPS 66 | 4.13 | 4 | |
| PEO | POLYSCIENCE | 0.0299 | 0.03 | NA |
| DOWICIL (ROLL MILL 15 MINUTES, HOMOGENEOUS, LESS FORM THAN 38-1) | DOW | 0.1012 | 0.1 | |
| BETAINE (HYGROSCOPIC), ROLL MILL 30 MIN., HOMOGENEOUS | SIGMA | 16.04 | 1.6 | |
| DIRECT RED 227 Na (16.0% DYE SOLIDS) | TRICON | 1.86 | 1.9 | 0.08 |
| BASACID X-34 | BASF | 10.59 | 10.6 | 0.92 |
| ROLL MILL 30 MINUTES, (HOMOGENEOUS, LESS FOAM THAN 38-1) | NA | NA | NA | NA |
| INK WEIGHT = 97.74 GM | NA | NA | NA | NA |
| RO WATER TO 100.00 GM INK | 103 | 2.26 | | |
| pH = 7.54 | NA | NA | NA | NA |
| ROLL MILL 30 MINUTES | NA | NA | NA | NA |

DRAWDOWN DRY TIME ON COURTLAND FELT PAPER = 120 SECONDS
INCORPORATION OF BETAINE TO BASELINE CONTROL WAS SLIGHTLY DETRIMENTAL TO DRY TIME.
BETAINE REDUCED THE FOAMING EFFECT OF PEO.

TABLE IV

| INGREDIENT/DESCRIPTION | VENDOR | AMOUNT (GM) | SOL N % | MOLE EQV |
|---|---|---|---|---|
| RO WATER | 103 | 18.04 | | NA |
| SULFOLANE (97%) | PHILLIPS 66 | 4.14 | 4 | |
| PEO | POLYSCIENCE | 0.293 | 0.03 | NA |
| DOWICIL (ROLL MILL 30 MINUTES, HOMOGENEOUS, FOAMED) | DOW | 0.1002 | 0.1 | |
| SODIUM CHLORIDE SOLUTION (25% NaCl SOLIDS, REAGENT A.C.S. SX0420-1) | EM SCIENCE | 64.05 | 16 | |
| SALT PRECIPITATED WHEN MIXED ROLL MILL 30 MINUTES, SLIGHTLY CLOUDY | NA | NA | NA | NA |
| DIRECT RED 227 Na 916.0% DYE SOLIDS) | TRICON | 1.86 | 1.9 | 0.8 |
| BASACID X-34 | BASF | 10.61 | 10.6 | 0.92 |
| ROLL MILL 30 MINUTES (SOME DYE PRECIPITATED) | NA | NA | NA | NA |
| INK WEIGHT = 98.70 GM | NA | NA | NA | NA |
| RO WATER TO 100.00 GM INK | 103 | 1.3 | | |
| pH = 7.42 | NA | NA | NA | NA |
| ROLL MILL 30 MINUTES | NA | NA | NA | NA |

DRAWDOWN DRY TIME ON COURTLAND FELT PAPER = 120 SECONDS.
INCORPORATION OF SODIUM CHLORIDE TO BASELINE CONTROL WAS SLIGHTLY DETRIMENTAL TO DRY TIME.
SODIUM CHLORIDE DESTABILIZED THE INK WHEREAS THE INTERNAL SALT, BETAINE, DID NOT.

TABLE V

| INGREDIENT/DESCRIPTION | VENDOR | AMOUNT (GM) | SOL N % | MOLE EQV |
|---|---|---|---|---|
| RO WATER | 103 | 64.44 | | NA |
| D,L-1,2-HEXANEDIOL | ALDRICH | 4 | 4 | |
| SULFOLANE (97%) | PHILLIPS 66 | 4.12 | 4 | |
| DIRECT RED 227 Na (16.0% DYE SOLIDS) | TRICON | 3.35 | 3.27 | 0.08 |
| BASACID X-34 | BASF | 18.39 | 18.27 | 0.92 |
| PEO | POLYSCIENCE | 0.0294 | 0.03 | NA |
| DOWICIL | DOW | 0.1007 | 0.1 | |
| ROLL MILL 30 MINUTES (HOMOGENEOUS, LOW FOAM) | NA | NA | NA | NA |
| INK WEIGHT = 94.44 GM | NA | NA | NA | NA |
| RO WATER TO 100.00 GM INK | 103 | 5.56 | | |
| pH = 7.49 | NA | NA | NA | NA |
| ROLL MILL 30 MINUTES, LOW FOAM FILTER 0.2 | NA | NA | NA | NA |

DRAWDOWN DRY TIME ON COURTLAND FELT PAPER = 3 SECONDS.
THE DRY TIME IMPROVEMENT FACTOR WAS 40 FOR 1,2-HEXANEDIOL RELATIVE TO BASELINE CONTROL
1,2-HEXANEDIOL REDUCED THE FOAMING EFFECT OF PEO.

TABLE VI

| INGREDIENT/DESCRIPTION | VENDOR | AMOUNT (GM) | SOL N % | MOLE EQV |
|---|---|---|---|---|
| RO WATER | 103 | 75.99 | | NA |
| SULFOLANE (97%) | PHILLIPS 66 | 4.14 | 4 | |
| 2-(2-BUTOXYETHOXY)ETHANOL(BUTYLCARBITOL, CLEAR WHITE) | EM SCIENCE | 4.01 | 4 | |
| PEO | POLYSCIENCE | 0.0296 | 0.03 | NA |
| DOWICIL (ROLL MILL 15 MINUTES, HOMOGENEOUS, LOW FOAM) | DOW | 0.1 | 0.1 | |
| DIRECT RED 227 Na (16.0% DYE SOLIDS) | TRICON | 1.84 | 1.9 | 0.08 |
| BASACID X-34 | BASF | 10.57 | 10.6 | 0.92 |
| ROLL MILL 30 MINUTES (HOMOGENEOUS, LOW FOAM) | NA | NA | NA | NA |
| INK WEIGHT = 96.68 GM | NA | NA | NA | NA |
| RO WATER TO 100.00 GM INK | 103 | 3.32 | | |
| pH = 7.37 | NA | NA | NA | NA |
| ROLL MILL 30 MINUTES | NA | NA | NA | NA |

DRAWDOWN DRY TIME ON COURTLAND FELT PAPER = 20 SECONDS.
THIS LOADING OF BC CUT DRY TIME BY A FACTOR OF 5 RELATIVE TO THE BASELINE CONTROL.
BUTYLCARBITOL APPEARS TO REDUCE THE FOAMING ACTION OF PEO.

TABLE VII

| INGREDIENT/DESCRIPTION | VENDOR | LOT # | SOL N % | MOLE EQV |
|---|---|---|---|---|
| RO WATER | 103 | NA | | NA |
| SULFOLANE (97%) | PHILLIPS 66 | 813 | 4 | |
| 1-CYCLOHEXYL-2-PYRROLIDINONE | ALDRICH | DM2004TH | 2 | |
| PEO | POLYSCIENCE | | 0.03 | NA |
| DOWICIL (ROLL MILL 15 MINUTES, HOMOGENEOUS FOAMED) | DOW | | 0.1 | |
| DIRECT RED 227 Na (16.0% DYE SOLIDS) | TRICON | RO #183 | 1.9 | 0.08 |
| BASACID X-34 | BASF | 01-6401 | 10.6 | 0.92 |
| ROLL MILL 30 MINUTES (HOMOGENEOUS, FOAMED) | NA | NA | NA | NA |
| INK WEIGHT = 96.83 GM | NA | NA | NA | NA |
| RO WATER TO 100.00 GM INK | 103 | NA | | |
| pH = 7.40 | NA | NA | NA | NA |
| ROLL MILL 30 MINUTES | NA | NA | NA | NA |

DRAWDOWN DRY TIME ON COURTLAND FELT PAPER = 25 SECONDS.
THIS LOADING OF CYCLOHEXYLPYRROLIDONE CUT DRY TIME BY A FACTOR OF 4 RELATIVE TO BASELINE CONTROL
CYCLOHEXYLPYRROLIDONE DOES NOT REDUCE THE FOAMING ACTION OF THE PEO AS DID THE ALCOHOL BASED PENETRANTS.

EXAMPLES II AND III

Ink compositions are prepared according to the descriptions in the following Tables VIII–IX. The compositions are tested for dry time and stability. The Examples II and III are compositions according to the present invention.

TABLE VIII

| INGREDIENT/DESCRIPTION | VENDOR | LOT # | SOL N % | MOLE EQV |
|---|---|---|---|---|
| RO WATER | 103 | NA | | NA |
| BETAINE (HYGROSCOPIC), ROLL MILL 5 MIN. HOMOGENEOUS | ESPRIT | | 16 | |
| D,L-1,2-HEXANEDIOL | ALDRICH | | 4 | |
| SULFOLANE (97%) | PHILLIPS 66 | 813 | 4 | |
| DIRECT RED 227 Na (16.0% DYE SOLIDS) | TRICON | RO #183 | 3.27 | 0.08 |
| BASACID X-34 | BASF | 01-6401 | 18.27 | 0.92 |
| PEO | POLYSCIENCE | | 0.03 | NA |
| DOWICIL | DOW | | 0.1 | |
| ROLL MILL 30 MINUTES (HOMOGENEOUS, LOW FOAM) | NA | NA | NA | NA |
| INK WEIGHT = 97.26 GM | NA | NA | NA | NA |
| RO WATER TO 100.00 GM INK | 103 | NA | | |
| pH = 7.65 | NA | NA | NA | NA |
| ROLL MILL 30 MINUTES, LOW FOAM FILTER | NA | NA | NA | NA |

DRAWDOWN DRY TIME ON COURTLAND FELT PAPER = 0.15 SECONDS.
BETAINE ENHANCED THE EFFECTIVENESS OF PENETRATION BY A FACTOR OF 20.

TABLE IX

| INGREDIENT/DESCRIPTION | VENDOR | AMOUNT (GM) | SOL N % | MOLE EQV |
|---|---|---|---|---|
| RO WATER | 103 | 59.97 | | NA |
| SULFOLANE (97%) | PHILLIPS 66 | 4.13 | 4 | |
| 2-(2-BUTOXYETHOXY)ETHANOL(BUTYLCARBITOL CLEAR WHITE, BC) | EM SCIENCE | 4.04 | 4 | |
| PEO | POLYSCIENCE | 0.0294 | 0.03 | NA |
| DOWICIL (ROLL MILL 15 MINUTES, HOMOGENEOUS, FOAMED) | DOW | 0.1012 | 0.1 | |
| BETAINE (HYGROSCOPIC), ROLL MILL 15 MIN. HOMOGENEOUS, LOW FOAM | SIGMA | 16.02 | 16 | |
| DIRECT RED 227 Na (16.0% DYE SOLIDS) | TRICON | 1.84 | 1.9 | 0.08 |
| BASACID X-34 | BASF | 10.59 | 10.6 | 0.92 |
| ROLL MILL 30 MINUTES (HOMOGENEOUS, LOW FOAM) | NA | NA | NA | NA |
| INK WEIGHT = 96.68 GM | NA | NA | NA | NA |
| RO WATER TO 100.00 GM INK | 103 | 3.32 | | |
| pH = 7.39 | NA | NA | NA | NA |
| ROLL MILL 30 MINUTES, DRAW DOWN | NA | NA | NA | NA |

DRAWDOWN DRY TIME ON COURTLAND FELT PAPER = 0.15 SECONDS.
BETAINE ENHANCED THE EFFECTIVENESS OF BC PENETRATION BY A FACTOR OF 130.
OF THE THREE PENETRANTS STUDIED THE EFFECT OF BETAINE WAS MOST DRAMATIC FOR BC.

Comparative Examples 7–10

Ink compositions are prepared according to the descriptions in the following Tables X–XIII. The compositions are tested for dry time and stability.

TABLE X

| INGREDIENT/DESCRIPTION | VENDOR | AMOUNT (GM) | SOL N % | MOLE EQV |
|---|---|---|---|---|
| RO WATER | 103 | 62.02 | | NA |
| SULFOLANE (97%) | PHILLIPS 66 | 4.13 | 4 | |
| 1-CYCLOHEXYL-2-PYRROLIDINONE (CLEAR AMBER) | ALDRICH | 1.98 | 2 | |
| PEO | POLYSCIENCE | 0.0299 | 0.03 | NA |
| DOWICIL (ROLL MILL 15 MINUTES, HOMOGENEOUS, FOAMED) | DOW | 0.1001 | 0.1 | |
| DIRECT RED 227 Na (16.0% DYE SOLIDS) | SIGMA | 16.04 | 16 | |
| BASACID X-34 | TRICON | 1.84 | 1.9 | 0.08 |
| ROLL MILL 30 MINUTES (HOMOGENEOUS, LOW FOAM) | BASF | 10.57 | 10.6 | 0.92 |
| INK WEIGHT = 96.70 GM | NA | NA | NA | NA |
| RO WATER TO 100.00 GM INK | NA | NA | NA | NA |
| pH = 7.50 | 103 | 3.3 | | |
| ROLL MILL 30 MINUTES | NA | NA | NA | NA |
| | NA | NA | NA | NA |

DRAWDOWN DRY TIME ON COURTLAND FELT PAPER = 15 SECONDS.

TABLE X-continued

| INGREDIENT/DESCRIPTION | VENDOR | AMOUNT (GM) | SOL N % | MOLE EQV |
|---|---|---|---|---|

BETAINE ENHANCED THE EFFECTIVENESS OF CYCLOHEXYLPYRROLIDONE PENETRATION BY A FACTOR OF 17
BETAINE HAS A MODERATE EFFECT OF INCREASING THE PENETRATING POWER OF CH

TABLE XI

| INGREDIENT/DESCRIPTION | VENDOR | AMOUNT (GM) | SOL N % | MOLE EQV |
|---|---|---|---|---|
| RO WATER | 103 | 14 | | NA |
| SULFOLANE (97%) | PHILLIPS 66 | 4.11 | 4 | |
| D,L-1,2-HEXANEDIOL | ALDRICH | 4.01 | 4 | |
| PEO | POLYSCIENCE | 0.0298 | 0.03 | NA |
| DOWICIL (ROLL MILL 30 MINUTES, HOMOGENEOUS, FOAMED) | DOW | 0.0998 | 0.1 | |
| SODIUM CHLORIDE SOLUTION (25% NaCl SOLIDS, REAGENT A.C.S., SX0420-1) | EM SCIENCE | 64 | 16 | |
| SALT PRECIPITATED WHEN MIXED ROLL MILL 30 MINUTES, SLIGHTLY CLOUDY | NA | NA | NA | NA |
| DIRECT RED 227 Na (16.0% DYE SOLIDS) | TRICON | 1.88 | 1.9 | 0.08 |
| BASACID X-34 | BASF | 10.58 | 10.6 | 0.92 |
| ROLL MILL 30 MINUTES (SOME DYE PRECIPITATED) | NA | NA | NA | NA |
| INK WEIGHT-98.67 GM | NA | NA | NA | NA |
| RO WATER TO 100.00 GM INK | 103 | 1.33 | | |
| pH-7.39 | NA | NA | NA | NA |
| ROLL MILL 30 MINUTES | NA | NA | NA | NA |

DRAWDOWN DRY TIME ON CF-0.1 SECONDS
SODIUM CHLORIDE INCORPORATION ENHANCED THE EFFECTIVENESS OF PENETRATION BY A FACTOR OF 30

TABLE XII

| INGREDIENT/DESCRIPTION | VENDOR | AMOUNT (GM) | SOL N % | MOLE EQV |
|---|---|---|---|---|
| RO WATER | 103 | 13.98 | | NA |
| SULFOLANE (97%) | PHILLIPS 66 | 4.12 | 4 | |
| 2-(2-BUTOXYETHOXY)ETHANOL(BUTYLCARBITOL CLEAR WHITE) | EMSCIENCE | 4.01 | 4 | |
| PEO | POLYSCIENCE | 0.0305 | 0.03 | NA |
| DOWCIL (ROLL MILL 15 MINUTES, HOMOGENEOUS, LOW FORM) | DOW | 0.0995 | 0.1 | |
| SODIUM CHLORIDE SOLUTION (25% NaCl SOLIDS, REAGENT A.C.S. SX0420-1) | EMSCIENCE | 64.03 | 16 | |
| SALT PRECIPITATED WHEN MIXED ROLL MILL 30 MINUTES, SLIGHTLY CLOUDY | NA | NA | NA | NA |
| DIRECT RED 227 Na (16.0% DYE SOLIDS) | TRICON | 1.86 | 1.9 | 0.08 |
| BASACID X-34 | BASF | 10.62 | 10.6 | 0.92 |
| ROLL MILL 30 MINUTES (SOME DYE PRECIPITATED) | NA | NA | NA | NA |
| INK WEIGHT-98.77 GM | NA | NA | NA | NA |
| RO WATER TO 100.00 GM INK | 103 | NA | | |
| pH-7.37 | NA | NA | NA | NA |
| ROLL MILL 30 MINUTES | NA | NA | NA | NA |

DRAWDOWN DRY TIME ON COURTLAND FELT PAPER-0.15 SECONDS
SODIUM CHLORIDE INCORPORATION ENHANCED THE EFFECTIVENESS OF BUTYLCARBITOL PENETRATION BY A FACTOR OF 130.
BOTH BETAINE AND SODIUM CHLORIDE WERE EQUALLY EFFECTIVE WITH BC.

TABLE XIII

| INGREDIENT/DESCRIPTION | VENDOR | AMOUNT (GM) | SOL N % | MOLE EQV |
|---|---|---|---|---|
| RO WATER | 103 | 16.05 | | NA |
| SULFOLANE (97%) | PHILLIPS 66 | 4.14 | 4 | |
| 1-CYCLOHEXYL-2-PYRROLIDINONE (AMBER) | ALDRICH | 1.99 | 2 | |
| PEO | POLYSCIENCE | 0.0309 | 0.03 | NA |
| DOWICIL (ROLL MILL 15 MINUTES, HOMOGENEOUS, | DOW | 0.101 | 0.1 | |

TABLE XIII-continued

| INGREDIENT/DESCRIPTION | VENDOR | AMOUNT (GM) | SOL N % | MOLE EQV |
|---|---|---|---|---|
| FOAMED) | | | | |
| SODIUM CHLORIDE SOLUTION (25% NaCl SOLIDS, REAGENT A.C.S. SX0420-1) | EMSCIENCE | 64.16 | 16 | |
| SALT PRECIPITATED WHEN MIXED ROLL MILL 30 MINUTES, SLIGHTLY CLOUDY | NA | NA | NA | NA |
| DIRECT RED 227 Na (16.0% DYE SOLIDS) | TRICON | 1.84 | 1.9 | 0.08 |
| BASACID X-34 | BASF | 10.6 | 10.6 | 0.92 |
| ROLL MILL 30 MINUTES (SOME DYE PRECIPITATED) | NA | NA | NA | NA |
| INK WEIGHT-98.89 GM | NA | NA | NA | NA |
| RO WATER TO 100.00 GM INK | 103 | 1.11 | | |
| pH-7.42 | NA | NA | NA | NA |
| ROLL MILL 30 MINUTES | NA | NA | NA | NA |

DRAWDOWN DRY TIME ON COURTLAND FELT PAPER-0.2 SECONDS.
SODIUM CHLORIDE INCORPORATION ENHANCED THE EFFECTIVENESS OF CYCLOHEXYLPYRROLIDONE PENETRATION BY A FACTOR OF 135.
THE SODIUM CHLORIDE WAS APPROXIMATELY 80 TIMES AS EFFECTIVE AS BETAINE FOR ACTIVATING THE PENETRATING OF CHP IN THE LOADINGS TESTED.
IT IS HYPOTHESIZED THAT BETAINE IS LESS EFFECTIVE AT SALTING OUT PYRROLIDONES THAN ALCOHOLS AND THAT THE SALTING OUT OF THE PENETRANT IS RESPONSIBLE FOR INCREASING THE PENETRATING POWER OF THE INK.

The Examples and Comparative Examples show that ink compositions according to the present invention containing a surfactant comprising a betaine zwitterionic base in a quasisurfactant penetrant substantially reduce ink dry time. Additionally, the ink jet printing compositions containing a surfactant comprising a betaine zwitterionic base and a quasisurfactant penetrant are stable ink compositions.

While the invention has been described with reference to particular preferred embodiments, the invention is not limited to the specific examples given, and other embodiments and modifications can be made by those skilled in the art without departing from the spirit and scope of the invention and claims.

What is claimed is:

1. An ink jet printing composition containing a liquid vehicle, a colorant and a surfactant comprising 10 to 20 wt. % betaine zwitterionic base and 2 to 5 wt. % quasisurfactant penetrant.

2. The ink jet printing composition of claim 1, wherein said betaine zwitterionic base is characterized by a —OOC.CH$_2$.N(CH$_3$)$_3$+ moiety.

3. The ink jet printing composition of claim 1, wherein said betaine zwitterionic base is betaine or carnitine.

4. The ink jet printing composition of claim 1, wherein said quasisurfactant penetrant is a surfactant that is substituted with a polar substituent toward one end of a chain of 4–8 aliphatic carbon atoms.

5. The ink jet printing composition of claim 4, wherein said quasisurfactant penetrant is selected from the group consisting of dl-1,2-hexanediol, 1,2-octanediol, diethylene glycol butyl ether, 1-cyclohexyl-2-pyrrolidinone, 2-methyl-2-propyl-1,3-propanediol and 1-butanesulfonic acid sodium salt.

6. The ink jet printing composition of claim 4, wherein said quasisurfactant is dl-1,2-hexanediol.

7. The ink jet printing composition of claim 1, comprising 12 to 18 wt. % betaine and 2 to 4 wt. % quasisurfactant penetrant.

8. An ink jet printing process, comprising causing an ink jet composition containing a liquid vehicle, a colorant and a surfactant comprising 10 to 20 wt. % betaine zwitterionic base and 2 to 5 wt. % quasisurfactant penetrant to be ejected in an imagewise fashion from a thermal ink jet printer onto a substrate.

9. The ink jet printing process of claim 8, wherein said betaine zwitterionic base is characterized by a —OOC.CH$_2$.N(CH$_3$)$_3$+ moiety.

10. The ink jet printing process of claim 8, wherein said betaine zwitterionic base is betaine or carnitine.

11. The ink jet printing process of claim 8, wherein said quasisurfactant penetrant is a surfactant that is substituted with a polar substituent toward one end of a chain of 4–8 aliphatic carbon atoms.

12. The ink jet printing process of claim 11, wherein said quasisurfactant penetrant is selected from the group consisting of dl-1,2-hexanediol, 1,2-octanediol, diethylene glycol butyl ether, 1-cyclohexyl-2-pyrrolidinone, 2-methyl-2-propyl-1,3-propanediol and 1-butanesulfonic acid sodium salt.

13. The ink jet printing process of claim 11, wherein said quasisurfactant is dl-1,2-hexanediol.

14. The ink jet printing process of claim 8, comprising 12 to 18 wt. % betaine and 2 to 4 wt. % quasisurfactant penetrant.

15. A method of improving the fast dry characteristics of ink jet inks comprising incorporating into an ink jet composition a surfactant comprising 10 to 20 wt. % betaine zwitterionic base and 2 to 5 wt. % quasisurfactant penetrant.

16. The method of claim 15, wherein said betaine zwitterionic base is characterized by a —OOC.CH$_2$.N(CH$_3$)$_3$+ moiety.

17. The method of claim 15, wherein said betaine zwitterionic base is betaine or carnitine.

18. The method of claim 15, wherein said quasisurfactant penetrant is a surfactant that is substituted with a polar substituent toward one end of a chain of 4–8 aliphatic carbon atoms.

19. The method of claim 18, wherein said quasisurfactant penetrant is selected from the group consisting of dl-1,2-hexanediol, 1,2-octanediol, diethylene glycol butyl ether, 1-cyclohexyl-2-pyrrolidinone, 2-methyl-2-propyl 1,3-propanediol and 1-butanesulfonic acid sodium salt.

20. The method of claim 18, wherein said quasisurfactant is dl-1,2-hexanediol.

21. The method of claim 15, wherein said surfactant comprises 12 to 18 wt. % betaine and 2 to 4 wt. % quasisurfactant penetrant.

* * * * *